United States Patent
Darby et al.

(10) Patent No.: US 9,767,202 B2
(45) Date of Patent: Sep. 19, 2017

(54) LINKING CONTENT FILES

(75) Inventors: Matthew Thomas Darby, San Francisco, CA (US); Fredrik Lundh, Wädenswil (CH); Matthew Wiseman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 453 days.

(21) Appl. No.: 13/535,262

(22) Filed: Jun. 27, 2012

(65) Prior Publication Data
US 2013/0024758 A1    Jan. 24, 2013

Related U.S. Application Data

(60) Provisional application No. 61/510,980, filed on Jul. 22, 2011.

(51) Int. Cl.
| | | |
|---|---|---|
| G06F 17/00 | (2006.01) | |
| G06F 17/30 | (2006.01) | |
| G06F 17/22 | (2006.01) | |

(52) U.S. Cl.
CPC .... G06F 17/30867 (2013.01); G06F 17/2235 (2013.01); G06F 17/30014 (2013.01);
(Continued)

(58) Field of Classification Search
CPC ........... G06F 17/3089; G06F 17/30867; G06F 17/2235; G06F 17/30014; G06F 17/30029; G06F 17/30244; G06F 17/30781; G06F 17/3074; H04N 21/218; H04N 18/2181; H04N 18/218; H04N 21/2181
(Continued)

(56) References Cited

U.S. PATENT DOCUMENTS

| | | | |
|---|---|---|---|
| 7,680,881 B2 | 3/2010 | Knapp et al. | |
| 8,645,991 B2 * | 2/2014 | McIntire et al. | 725/34 |

(Continued)

FOREIGN PATENT DOCUMENTS

| | | |
|---|---|---|
| CN | 101901619 A | 12/2010 |
| CN | 102012937 A | 4/2011 |

(Continued)

OTHER PUBLICATIONS

Cha et al., "I Tube, You Tube, Everybody Tubes: Analyzing the World's Largest User Generated Content Video System", Oct. 24-26, 2007, San Diego, California, USA, Copyright 2007, ACM978-1-59593-908-1/07/0010, pp. 13.*

(Continued)

*Primary Examiner* — Chau Nguyen
(74) *Attorney, Agent, or Firm* — Lowenstein Sandler LLP

(57) ABSTRACT

A system and method for linking content files is disclosed. The system comprises a targeting module, a link generation module and a graphic user interface module (GUI module). The targeting module determines a target content file based at least in part on an uploaded content file. The target content file comprises a long form content file. The link generation module is communicatively coupled to the targeting module for generating a link to the target content file. The GUI module is communicatively coupled to the targeting module and to the link generation module for generating a web page. The web page includes a playable version of the uploaded content file and the link to the target content file.

18 Claims, 10 Drawing Sheets

(52) U.S. Cl.
CPC .... *G06F 17/30029* (2013.01); *G06F 17/3074* (2013.01); *G06F 17/3089* (2013.01); *G06F 17/30244* (2013.01); *G06F 17/30781* (2013.01); *G06F 17/30855* (2013.01)

(58) Field of Classification Search
USPC .......................................................... 715/205
See application file for complete search history.

(56) References Cited

U.S. PATENT DOCUMENTS

| | | | |
|---|---|---|---|
| 9,235,848 B1* | 1/2016 | Gourley | G06Q 30/0209 |
| 2007/0061487 A1 | 3/2007 | Moore et al. | |
| 2007/0255747 A1* | 11/2007 | Lee | G06F 17/30038 |
| 2007/0265969 A1* | 11/2007 | Horwat et al. | 705/51 |
| 2007/0294254 A1 | 12/2007 | Yao | |
| 2008/0086689 A1 | 4/2008 | Berkley et al. | |
| 2008/0092159 A1* | 4/2008 | Dmitriev | G06Q 30/0269 725/34 |
| 2008/0201255 A1 | 8/2008 | Green | |
| 2008/0207182 A1 | 8/2008 | Maharajh et al. | |
| 2008/0209343 A1 | 8/2008 | Macadaan et al. | |
| 2008/0320512 A1* | 12/2008 | Knight | G06Q 30/02 725/32 |
| 2009/0007274 A1 | 1/2009 | Martinez et al. | |
| 2009/0063277 A1* | 3/2009 | Bernosky et al. | 705/14 |
| 2009/0089310 A1* | 4/2009 | Lara et al. | 707/102 |
| 2009/0113315 A1 | 4/2009 | Fisher et al. | |
| 2009/0113475 A1 | 4/2009 | Li | |
| 2009/0157450 A1 | 6/2009 | Athsani et al. | |
| 2009/0265213 A1* | 10/2009 | Hyman | G06F 17/30035 705/59 |
| 2009/0271283 A1 | 10/2009 | Fosnacht et al. | |
| 2009/0271289 A1 | 10/2009 | Klinger et al. | |
| 2009/0319516 A1 | 12/2009 | Igelman et al. | |
| 2010/0049608 A1* | 2/2010 | Grossman | 705/14.55 |
| 2010/0115430 A1 | 5/2010 | Skirpa | |
| 2010/0153848 A1 | 6/2010 | Saha | |
| 2010/0158391 A1 | 6/2010 | Cunningham et al. | |
| 2010/0169153 A1 | 7/2010 | Hwacinski et al. | |
| 2010/0280985 A1* | 11/2010 | Duchon | G06Q 10/10 706/52 |
| 2010/0293190 A1 | 11/2010 | Kaiser et al. | |
| 2011/0035382 A1* | 2/2011 | Bauer et al. | 707/741 |
| 2011/0035384 A1* | 2/2011 | Qiu | G06Q 10/107 707/748 |
| 2011/0161076 A1 | 6/2011 | Davis et al. | |
| 2011/0238495 A1* | 9/2011 | Kang | G06Q 30/02 705/14.49 |
| 2011/0307830 A1 | 12/2011 | Robert et al. | |
| 2012/0011085 A1 | 1/2012 | Kocks | |
| 2012/0030586 A1* | 2/2012 | Ketkar | G06F 17/3089 715/751 |
| 2012/0030587 A1* | 2/2012 | Ketkar | 715/751 |

FOREIGN PATENT DOCUMENTS

| | | |
|---|---|---|
| CN | 102084358 A | 6/2011 |
| WO | 2011082496 | 7/2011 |

OTHER PUBLICATIONS

Song et al., "Automatic Extraction of Web Data Records Containing User-Generated Content", Oct. 26-30, 2010, Toronto, Ontario, Canada, Copyright 2010 ACM, pp. 10.*
Ochoa et al., "Quantitative Analysis of User-Generated Content on the Web", Apr. 21-25, 2008, Beijing, China, pp. 8.*
International Search Report and Written Opinion for PCT/US12/44477, Sep. 17, 2012, 11 pgs.
International Search Report and Written Opinion for PCT/US12/46103, Sep. 25, 2012, 13 pgs.
USPTO, Office Action for U.S. Appl. No. 13/535,235, mailed Feb. 4, 2014.
USPTO, Office Action for U.S. Appl. No. 13/535,235, mailed Aug. 26, 2014.
USPTO, Final Office Action for U.S. Appl. No. 13/535,235, mailed Feb. 11, 2015.
USPTO, Office Action for U.S. Appl. No. 13/535,235, mailed Sep. 23, 2015.
USPTO, Final Office Action for U.S. Appl. No. 13/535,235, mailed May 13, 2014.
USPTO, Final Office Action for U.S. Appl. No. 13/535,235, mailed Feb. 23, 2016.
EP Search Report for European Patent Application No. 12817114.7, mailed Apr. 1, 2016, 8 pages.

* cited by examiner

LINKING CONTENT FILES

CROSS REFERENCE

This application claims priority from the following U.S. provisional patent application, which is hereby incorporated by reference: Ser. No. 61/510,980, filed on Jul. 22, 2011 and entitled "SYSTEM FOR LINKING VIDEOS."

BACKGROUND

The specification relates to a data management system and, more specifically, a system for linking content files.

Numerous websites host videos for viewing by users. A video hosting site manages videos that are accessed by clients. Publishers upload video content to the video hosting site. The video hosting site pushes videos uploaded by publishers to the client.

Some of these videos hosted by the video hosting site are User-Generated Video Content (UGVC) that relate to other videos. For example, a fan of a first movie makes a tribute video including content from the full-length version of the first movie. The tribute video is related to the full-length version of the first movie. A user viewing the tribute video might be interested in watching the full-length version of the first movie, or other videos relating to the full-length version of the first movie. For example, videos featuring interviews with actors who acted in the first movie and are discussing the first movie might be of interest to a user that views the tribute video.

A first problem present in existing systems is that they do not provide a mechanism for linking a long form of a video to short form derivatives. For example, the existing systems do not provide a link to a full version video for a UGVC that is taken from the full version video.

A second problem in existing system is that they fail to analyze the UGVC and user activities around the UGVC to link the UGVC to a long form video and/or associated videos.

SUMMARY

Embodiments disclosed herein provide a system and method for linking content files. An asset hosting site comprises an upload server, a targeting module, a link generation module and a graphic user interface module ("GUI module"). The upload server receives an uploaded content file and stores it in a storage device. The targeting module determines a target content file based at least in part on the uploaded content file. In one embodiment, the uploaded content file comprises a UGVC, such as a video clip, a homage video and a parody. The target content file comprises a long form content file, such as a full version movie and an episode of a television show.

The link generation module is communicatively coupled to the targeting module for generating a link to the target content file. The GUI module is communicatively coupled to the targeting module and to the link generation module for generating a web page for the uploaded content file. The web page includes a playable version of the uploaded content file and the link to the target content file.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
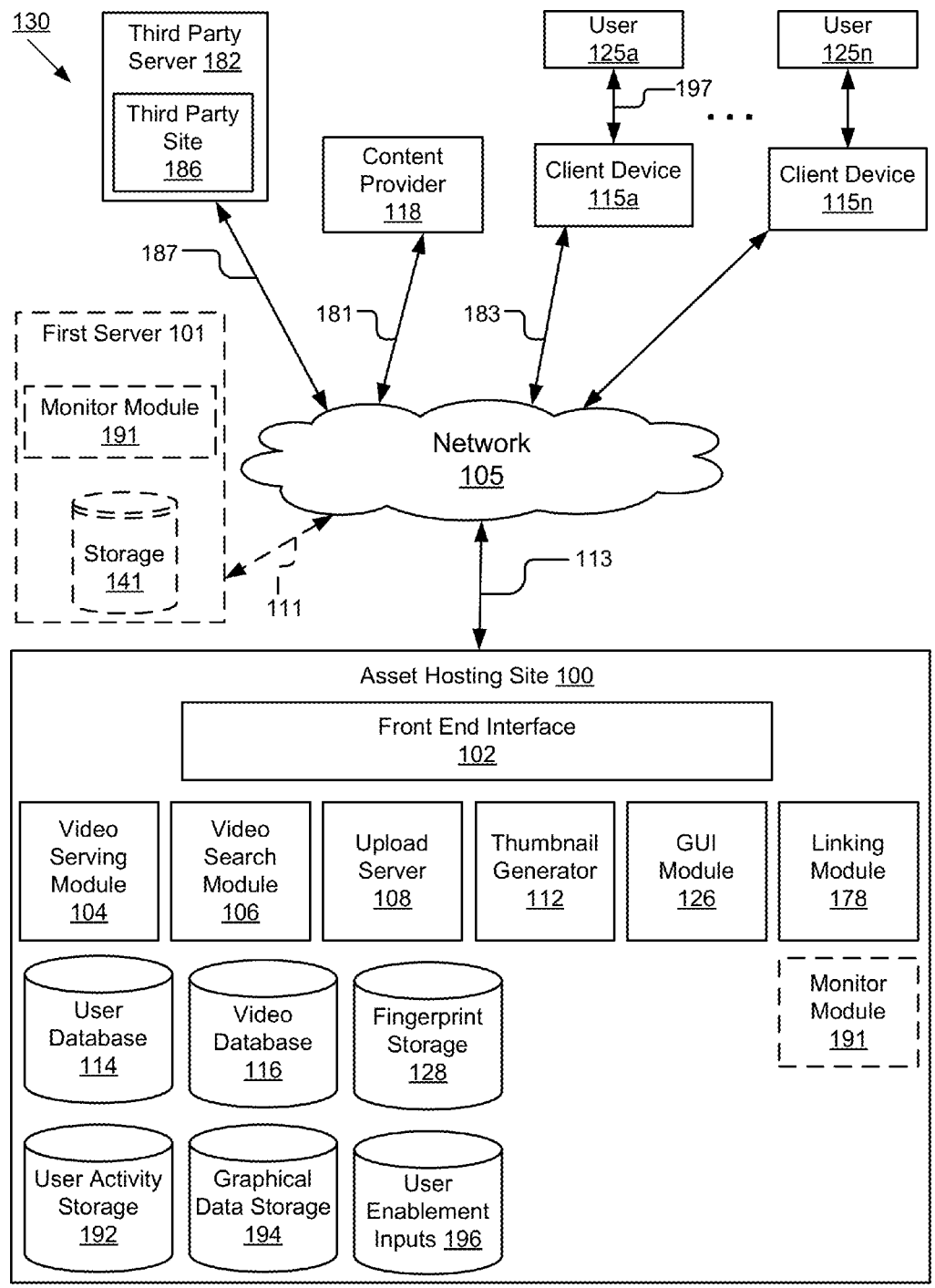
FIG. 1 is a high-level block diagram illustrating one embodiment of a system for linking content files.

A system and method for linking content files is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable storage medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

Finally, embodiments described herein include collection of data describing a user and/or activities of users. In one embodiment, such data is only collected upon the user providing consent to the collection of this data. In some implementations, a user is prompted to explicitly allow data collection. Further, the user may opt-in or opt-out of participating in such data collection activities. In one embodiment, the collected data is anonymized prior to performing any analysis to obtain any statistical patterns so that the identity of the user cannot be determined from the collected data.

System Overview

FIG. 1 illustrates a block diagram of a system 130 for linking content files according to one embodiment. The illustrated embodiment of the system 130 includes client devices 115*a*, 115*n* (also referred to collectively or individually as client devices 115) that are accessed by users 125*a*, 1.25*n* (also referred to collectively or individually as client devices 125), a content provider 118, an asset hosting site 100 including a linking module 178, a third party server 182 and a first server 101. The first server 101 is depicted in FIG. 1 using a dotted line to indicate that it is an optional feature of the system 130. In the illustrated embodiment, these entities are communicatively coupled via a network 105. For example, the asset hosting site 100, the content provider 118, the third party server 182 and the client devices 115 are communicatively coupled to one another via a network 105 to facilitate sharing of information (e.g., video content file) between users 125 of client devices 115.

Although one content provider 118, two client devices 115, one third party server 182, one asset hosting site 100 and one first server 101 are illustrated in FIG. 1, persons having ordinary skill in the art will recognize that any number of content providers 118, client devices 115, third party servers 182, asset hosting sites 100 and first servers 101 can be communicatively coupled to the network 105. Furthermore, while one network 105 is coupled to the third party server 182, the client devices 115, the content provider 118, the asset hosting site 100 and the first server 101, persons having ordinary skill in the art will appreciate that any number of networks 105 can be connected to the third party server 182, the client devices 115, the content provider 118, the asset hosting site 100 and the first server 101.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In the illustrated embodiment, the content provider 118 is communicatively coupled to the network 105 via signal line 181. The client device 115a is coupled to the network 105 via signal line 183. The user 125a interacts with the client device 115a as represented by signal line 197. Client device 115n and user 125n are coupled and interact in a similar manner. The first server 101 is communicatively coupled to the network 105 via signal line 111. The third party server 182 is communicatively coupled to the network 105 via signal line 187. The asset hosting site 100 is communicatively coupled to the network 105 via signal line 113.

The third party server 182 is a hardware server that is configured to host a third-party site 186. A third-party site includes code and routines configured, when executed by a processor (not pictured) of the third party server 182, to provide one or more of a social network website, a blog website, a microblog website, a messaging board and an electronic mail service ("e-mail service"). In one embodiment, a third-party site 186 is a website that implements different features of one or more of a social network website, a blog website, a microblog website, a messaging board and an e-mail service. For example, the third party site 186 is a social network that also provides e-mail service.

In one embodiment, the third party site 186 hosts videos uploaded by one or more content providers 118 and/or users 125 of client devices 115. For example, the third party site 186 is a social network that hosts videos uploaded by a user 125 of a client device 115. A user 125 uses a client device 115 to upload a video to the third party site 186. Other users 125 view the video on the third party site 186 (a user 125 that views a video is referred to herein as a "viewer"). Some of these viewers will "like" the video, provide comments about the video or perform other social interactions with the video known to those familiar with social networking.

The first server 101 is a hardware server device. For example, the first server 101 is a hardware server operated by Google® of Mountain View, Calif. In one embodiment, the first server 101 is operated by an entity other than Google®. The first server 101 comprises, among other things, monitor module 191 and a storage device 141. The first server 101 additionally comprises a processor (not pictured), a memory (not pictured) and other components conventional to a hardware server device (e.g., firewall, network card, etc.).

The first server 101 is depicted in FIG. 1 using a dotted line to indicate that it is an optional feature of the system 130. Accordingly, in one embodiment the system 130 does not include the first server 101 and the monitor module 191 is stored on the asset hosting site 100.

The monitor module 191 is depicted in FIG. 1 using a dotted line to indicate that it can be an element of either the asset hosting site 100 or the first server 101. For example, in one embodiment the monitor module 191 is an element of the asset hosting site 100 and not an element of the first server 101. In another embodiment, the monitor module 191 is an element of the asset hosting site 100 and the system 130 does not include a first server 101 or storage 141.

The monitor module 191 includes code and routines configured, when executed by the processor of the first server 101, to monitor user activities with videos hosted on one or more third party sites 186 and/or the asset hosting site 100 and to determine how users 125 interact with videos hosted by the third party site 186 or other video hosting sites such as the asset hosting site 100. The monitor module 191 is stored on a tangible non-transitory memory of the first server 101.

In one embodiment, the monitor module 191 includes one or more of a parser, a web crawler and a similar computer program sub-module that is configured, when executed by the processor of the first server 101, to monitor user activities with videos hosted on one or more third party sites 186 and/or the asset hosting site 100. The monitor module 191 collects data describing user activity with videos and stores this data in the first storage device 141. This data is referred to herein as "social data".

In one embodiment, the monitor module 191 shares the social data with the asset hosting site 100. For example, one or more of the third party sites 186 and/or the asset hosting site 100 establish a feed with the monitor module 191 and transmit data to the monitor module 191 describing user activity (e.g., social activity) with one or more videos hosted on the third party sites 186 and/or the asset hosting site 100. In this embodiment, the monitor module 191 comprises computer code configured, when executed by a processor of the first server 101, to receive the feed and store the data in the storage device 141. In one embodiment, the monitor module 191 receives data describing user activity with videos using one or more of a parser, a web crawler and a feed. Thus, the monitor module 191 can receive data describing user activity with videos via more than one source.

In one embodiment, the monitor module 191 embeds a cookie in a third party site 186 and receives communications from the cookie reporting the user activity. In another embodiment, the user 125 is given an opportunity to opt-out of all monitoring performed by the monitor module 191. For example, the third party site 186 displays a graphical user interface describing a privacy policy and giving the user 125 an opportunity to opt out of monitoring as such as that provided by the monitor module 191. In one embodiment, the privacy policy includes anonymizing all data collected about the user 125 so that the identity of the user 125 cannot be determined from the data collected by the monitor module 191.

The storage device 141 is a non-transitory memory that stores data collected by the monitor module 191. In one embodiment, the storage device 141 also stores videos and video data associated with the videos. Video data is any data associated with a video.

In one embodiment, the data stored on the first server 101 describing the user 125 and the user's 125 activity is only collected upon the user 125 providing consent to the collection of this data. In some implementations, a user 125 is prompted to explicitly allow data collection. Further, the user 125 may opt-in or opt-out of participating in such data collection activities. In one embodiment, the collected data is anonymized prior to performing any analysis to obtain any statistical patterns so that the identity of the user 125 cannot be determined from the collected data.

The asset hosting site 100 is any system that allows users to access video content via searching and/or browsing interfaces. An example of an asset hosting site 100 is the YOUTUBE™ website, found at www.youtube.com. Other video hosting sites are known as well, and are adapted to operate according to the teachings disclosed herein. It will be understood that the term "website" represents any computer system adapted to serve content using any internet protocols, and is not intended to be limited to content uploaded or downloaded via the Interact or the HTTP protocol.

In one embodiment, sources of the video content on the asset hosting site 100 are from uploads of videos by users, searches or crawls of other websites or databases of videos, or the like, or any combination thereof. For example, in one embodiment, the asset hosting site 100 is configured to allow upload of video content by users 125 and/or content providers 118. In another embodiment, the asset hosting site 100 is configured to obtain videos from other sources by crawling such sources or searching such sources in real time.

To simplify and clarify the present description, the video content files received and shared by the asset hosting site 100 will be referred to as videos, video files, or video items. Persons having ordinary skill in the art will recognize that the asset hosting site 100 can receive and share content of any media type and file type. For example, the asset hosting site 100 shares a content file such as a video, an audio, a combination of video and audio, an image such as a JPEG or GIF file and/or a text file, etc.

The asset hosting site 100 is communicatively coupled to the network 105 via signal line 113. In the illustrated embodiment, the asset hosting site 100 includes: a front end interface 102; a video serving module 104; a video search module 106; an upload server 108; a thumbnail generator 112; a GUI module 126; a user database 114; a video database 116; a fingerprint storage 128; a user enablement inputs storage 196; a graphical data storage 194; a user activity storage 192; a linking module 178 and a monitor module 191. The components of the asset hosting site 100 are communicatively coupled to one another. Other conventional features, such as firewalls, load balancers, authentication servers, application servers, failover servers, site management tools, and so forth are not shown so as not to obscure the feature of the system.

The monitor module 191 is depicted in FIG. 1 using a dashed line to indicate that it is an optional feature of the asset hosting site 100. For example, in one embodiment the monitor module 191 is stored in the first server 101.

In one embodiment, the illustrated components of the asset hosting site 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the asset hosting site 100 are performed by one or more client devices 115 and/or content providers 118 in other embodiments if appropriate. In one embodiment, the functionality attributed to a particular component is performed by different or multiple components operating together.

Each of the various servers and modules on the asset hosting site 100 is implemented as a server program executing on a server-class computer comprising one or more central processing units ("CPU," or "CPUs" if plural), memory, network interface, peripheral interfaces, and other well-known components. In one embodiment, the computers themselves run an open-source operating system such as LINUX, have one or more CPUs, 1 gigabyte or more of memory, and 100 gigabytes or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in one or more tangible, non-transitory computer-readable storage mediums (e.g., random access memory ("RAM"), flash, solid-state drive ("SSD"), hard disk drive, optical/magnetic media, etc.).

The front end interface 102 is an interface that handles communication with the first server 101, content provider 118 and client devices 115 via the network 105. For example, the front end interface 102 receives video files uploaded from the content provider 118 and/or users 125 of the client devices 115 and delivers the video files to the upload server 108. In one embodiment, the front end interface 102 receives requests from users 125 of the client devices 115 and delivers the requests to the other components of the asset hosting site 100 (e.g., the video search module 106, the video serving module 104, etc.). For example, the front end interface 102 receives a video search query from a user 125 and sends the video search query to the video search module 106.

In one embodiment, the front end interface 102 receives one or more linking enablement inputs from the content provider 118 and/or the users 125 of the client devices 115. The front end interface 102 stores the linking enablement inputs in the user enablement inputs storage 196 that are retrieved later by the linking module 178. The user enablement inputs storage 196 and the linking module 178 are described in detail below.

The upload server 108 receives video files from the content provider 118 and/or users 125 operating on client devices 115 via the front end interface 102. In one embodiment, the upload server 108 processes the video files and stores the video files in the video database 116. For example, the upload server 108 assigns a video identifier (video ID) to a video and stores the video and the video ID in the video database 116. In another embodiment, the upload server 108 processes the video files and transmits the video files to the linking module 178. Further examples of processing a video file by the upload server 108 include performing one or more of: formatting; compressing; metadata tagging; and content analysis, etc.

The video database 116 is a storage system that stores video files shared by the asset hosting site 100 with the users 125. In one embodiment, the video database 116 stores the video files processed by the upload server 108. In another embodiment, the video database 116 stores metadata of the video files. For example, the video database 116 stores one or more of: a title; a video ID; description; tag information; and administrative rights of a video file. The administrative rights of a video file include one or more of: the right to delete the video file; the right to edit information about the video file; and the right to associate the video file with an advertisement, etc.

In one embodiment, at least some of the metadata of a video file is provided by the content provider 118 and/or the user 125. For example, the content provider 118 and/or the user 125 provide a title and/or a short description of a video when uploading the video to the asset hosting site 100. In another embodiment, the content provider 118 and/or the user 125 also provide a specification that indicates whether a video file uploaded by the content provider 118 and/or the user 125 is private, for reference, or public. A private video file and a video file for reference are not viewable by other users 125. In yet another embodiment, the content provider 118 and/or the user 125 includes a territorial limitation for the uploaded video file. These are described in more detail below with reference to FIGS. 3 and 8A-8B.

The video search module 106 includes code and routines that, when executed by a processor (not pictured), processes any search queries received by the front end interface 102 from a user 125 using a client device 115. A search query from a user 125 includes search criteria such as keywords that, for example, identify videos the user 125 is interested in viewing. In one embodiment, the video search module 106 uses the search criteria to query the metadata of video files stored in the video database 116. The video search module 106 returns the search results to the client device 115 via the front end interface 102. For example, if a user 125 provides a keyword search query to the video search module 106 via the front end interface 102, the video search module 106 identifies videos stored in the video database 116 matching the keyword and returns search results (e.g., video IDs, titles, descriptions, thumbnails of the identified videos) to the user 125 via the front end interface 102.

The video serving module 104 includes code and routines that, when executed by a processor (not pictured), processes requests for videos and serves videos to client devices 115. For example, the video serving module 104 receives a request for viewing a video from a user 125 of the client device 115, retrieves the video from the video database 116 based at least in part on the request and presents the video to the client device 115 via the front end interface 102.

In one embodiment, the video serving module 104 receives a request from a client device 115 to access a video when the user 125 clicks on a link to the video. The request received from the client device 115 includes the video ID of the video. In one embodiment, the video ID is included automatically in the request once the user 125 clicks on the link for the video. The video serving module 104 uses the video ID to search and locate the video in the video database 116. Once the requested video is located, the video serving module 104 sends the video to the client device 115 via the front end interface 102. In one embodiment, the video is presented to the user 125 on a web browser stored and executed by the client device 115. Metadata associated with the video such as the title and description of the video is also presented to the user 125. In one embodiment, the video serving module 104 stores the video ID of the video in the user database 114 after sending the video to the client device 115 so that a video viewing history of the user 125 is stored in the user database 114.

The user database 114 is a storage system that stores data and/or information associated with any user 125. For example, the user database 114 stores video IDs of video files uploaded by a user 125 so that a video uploading history of the user 125 is maintained in the user database 114. The user database 114 also stores video IDs of video files that the user 125 has accessed from the video database 116 for viewing so that a video viewing history for the user 125 is stored in the user database 114. In one embodiment, the user 125 is identified by using a unique user name and password and/or by using the user's 125 internet protocol address.

The thumbnail generator 112 includes code and routines that, when executed by a processor (not pictured), generates a thumbnail for a video. A thumbnail is an image that represents a video on the asset hosting site 100. For example, the thumbnail generator 112 analyzes the video and selects a frame from the video as the thumbnail. In one embodiment, the thumbnail generator 112 provides one or more images for the video and allows a publisher (e.g., a content provider 118 or a user 125 uploading the video using a client device 115) to select one image as the thumbnail.

The graphical data storage 194 is a storage system that stores graphical code for generating graphical user interfaces ("GUIs") for display to the user 125 in the browser of the client device 115. For example, the graphical data storage 194 stores graphical data for displaying a screen on a display of the client device 115 that allows the user 125 to opt-out of the services provided by the monitor module 191.

The GUI module 126 includes code and routines that, when executed by a processor (not pictured), generates a user interface that displays information to a user and/or allows a user to input information via the user interface. In one embodiment, the GUI module 126 provides the functionality described below for receiving inputs from users 125 and/or displaying information to users 125. The GUI module 126 is communicatively coupled to the front end interface 102. The GUI module 126 retrieves graphical data from the graphical data storage 194 and transmits the graphical data to the front end interface 102. The front end interface 102 communicates with the network 105 to transmit the graphical data to a processor-based computing device communicatively coupled to the network 105.

For example, the front end interface 102 transmits the graphical data to one or more of the content provider 118 and client device 115. One or more of the content provider 118 and the client device 115 receives the graphical data and generates a GUI displayed on a display device (e.g., a monitor) communicatively coupled to the content provider 118 and/or the client device 115. The GUI is displayed on a display device and viewed by a human user (such as a user 125). The GUI includes one or more fields, drop down boxes or other conventional graphics used by the human user to provide inputs that are then transmitted to the asset hosting site 100 via the network 105. Data inputted into the GUI is received by the front end interface 102 and stored in one or more the video database 116, user database 114 and the user activity storage 192.

In one embodiment, the GUI module 126 retrieves an uploaded content file (such as a UGVC) and generates a web page that includes a playable version of the uploaded content file. For example, the web page includes an embedded video player playing the uploaded content file to a user 125. In one embodiment, the web page also includes description (e.g., a title, an upload entity, a date of uploading, the number of views) for the uploaded content file. The GUI module 126 transmits the web page to the front end interface 102. The front end interface 102 communicates with the network 105 to transmit the web page to one or more of the client device 115, the content provider 118 and the third party server 182 for displaying the web page on a display device communicatively coupled to the client device 115, the content provider 118 and/or the third party server 182.

In one embodiment, the GUI module 126 also receives a link to a target content file (such as a full version movie from which an uploaded content file was taken) identified in one or more results generated by the linking module 178. The GUI module 126 then includes the link to the web page for playing the uploaded content file. For example, to either side of the video player is a link that says "Full version of this video." The link on the web page is clickable by the user 125 if the user wants to view, rent or purchase the full version video.

In another embodiment, the GUI module includes in the web page a list of content files related to the uploaded content file (such as other related video clips, other videos related to the target content file) and corresponding links to the content files related to the uploaded content file. The web page for playing the uploaded content file and showing the links is described in more detail below with reference to FIG. 4A.

Clicking the link to the target content file in the web page for playing the uploaded content file will direct to a second web page. For example, the GUI module 126 generates the second web page for showing information that describes the target content file and for providing a rental or a purchase option to users 125. The information about the target content file includes, for example, a description, reviews and other related contents to the target content file. The rental or purchase option is provided as a rental button or a click-to-buy button that is clickable by the users 125. In one embodiment, the GUI module 126 generates the second web page using metadata associated with the target content file. In one embodiment, the GUI module 126 generates a web page associated with a link for an advertisement that is clickable by the user 125.

In one embodiment, the GUI module 126 transmits the second web page to one or more of the client device 115, the content provider 118 and/or the third party server 182 via the front end interface 102 and the network 105 responsive to a click on the link to the target content file on the web page for playing the uploaded content file. The second web page is described in more detail below with reference to FIG. 4B.

In another embodiment, the GUI module 126 provides a user interface for displaying information to a user such as a tutorial, terms and agreements, etc. In yet another embodiment, the GUI module 126 provides a user interface that displays information to a user 125 and allows the user to input information via the user interface.

In one embodiment, the GUI module 126 transmits graphical data to the client device 115 that causes the browser of the client device 115 to display a GUI that provides the user 125 with a graphical input that the user 125 can use to explicitly opt-in or opt-out of data collection by the asset hosting site 100 (and/or the first server 101). If the user 125 provides an input opting out of data collection, the asset hosting site 100 and/or the first server 101 does not collect data describing the user 125 or the user's 125 activities. In one embodiment, if the user opts to participate in the data collection, the asset hosting site 100 and/or the first server 101 anonymize any data collected describing the user 125 and the user's 125 activities so that the identity of the user 125 cannot be determined from the collected data. In one embodiment, the GUI includes a written description of a privacy policy that describes how the collected data is anonymized and how the collected data will be used.

The user activity storage 192 is a storage system that stores data describing user activity on one or more third party sites 186 (such as social network sites, blog websites, microblog websites, messaging boards, e-mail services, video hosting sites, etc.) and one or more other video hosting sites such as the asset hosting site 100. For example, the user activity storage 192 stores social data described above with reference to the monitor module 191. In one embodiment, user activity storage 192 also stores data describing the websites visited by a user 125 before, during and after viewing a video file, a history of websites visited by viewers 125, the searches done by a user 125 before, during and after viewing a video file, a viewers' 125 search history, etc. In one embodiment, the user activity storage 192 is a non-transitory memory that stores videos, data associated with the videos (e.g., metadata), user profile information and other information associated with the content file linking system.

In one embodiment, the user activity storage 192 stores user profile information. User profile information is information associated with a user 125. For example, the user profile information includes one or more of a user name, an indication of videos submitted by the user 125 and information describing the popularity and profitability of videos submitted by the users 125. Persons of ordinary skill in the art will recognize that the user profile information may include other information related to the user 125. In one embodiment, the user activity storage 192 stores similar information describing the content provider 118 and videos uploaded by the content provider 118.

The linking module 178 includes code and routines that, when executed by a processor (not pictured), generates a link to a target content file (e.g., a video file that is a long form or full version movie, an episode of a television show) based at least in part on an uploaded content file (e.g., a video file that is a short form video, such as a clip, a homage video, a parodies, etc.) In one embodiment, the uploaded content file is a UGVC file. The target content file is a full version movie from which the UGVC file was taken.

In one embodiment, the linking module 178 determines the target content file based at least in part on the uploaded content file. For example, the linking module 178 determines a target video file by searching and matching fingerprints generated using fingerprint analysis of uploaded videos. The linking module 178 generates and stores the fingerprints for all uploaded videos in the fingerprint storage 128.

In one embodiment, the linking module 178 generates a link to the target content file according to a linking enablement input (also referred to as "a linking input" herein). For example, the linking module 178 retrieves a linking input from the user enablement inputs storage 196. If the linking input indicates that the linking is enabled, the linking module 178 generates a link to the target content file; otherwise, the linking module 178 does not generate a link to the target content file.

In one embodiment, the linking module 178 transmits the link to the GUI module 126 for generating a web page for playing the uploaded content file and showing the link to the target content file. These functionalities and more other functionalities of the linking module 178 are described in more detail below with reference to FIGS. 2 and 3.

The fingerprint storage 128 is a storage system that stores fingerprints for existing content files (such as videos). In one embodiment, the existing content files are videos stored in video database 116. For example, the upload server 108 receives videos uploaded by the content provider 118 and/or users 125 of client devices 115 and stores the videos in the video database 116. The linking module 178 generates fingerprints for the uploaded videos. The linking module 178 then stores the fingerprints in the fingerprint storage 128.

The fingerprint storage 128 stores fingerprints in association with corresponding video titles and/or video IDs. In one embodiment, the fingerprint storage 128 is organized to store fingerprints in one or more tables and matrices. For example, the fingerprints are stored in tables associated with corresponding video IDs. In another example, the fingerprint storage 128 stores the fingerprints in matrices according to the time order of receiving the videos.

The user enablement inputs 196 include linking inputs received by the front end interface 102 from content providers 118 and/or users 125 operating on client device 115.

A linking input indicates if the publisher or the owner of a content file (such as a video) has an authorized linking to the content file. Later, the linking module 178 retrieves the linking input from the user enablement inputs 196 to determine if the linking to a target content file is enabled by the publisher or the owner (i.e., if the publisher or the owner has an authorized linking to the target content file). The linking module 178 generates a link to the target content file if the linking is enabled.

The client device 115 is any computing device. For example, the client device 115a, 115n is a personal computer ("PC"), smart phone, tablet computer (or tablet PC), etc. One having ordinary skill in the art will recognize that other types of client devices 115 are possible. In one embodiment, the system 130 comprises a combination of different types of client devices 115. For example, a plurality of other client devices 115 is any combination of a personal computer, a smart phone and a tablet computer.

The client device 115 comprises a browser (not pictured). In one embodiment, the browser includes code and routines stored in a memory of the client device 115 and executed by a processor of the client device 115. For example, the browser is a browser application such as Google Chrome. The user 125 is a human user of the client device 115.

Linking Module 178

Figure 2:
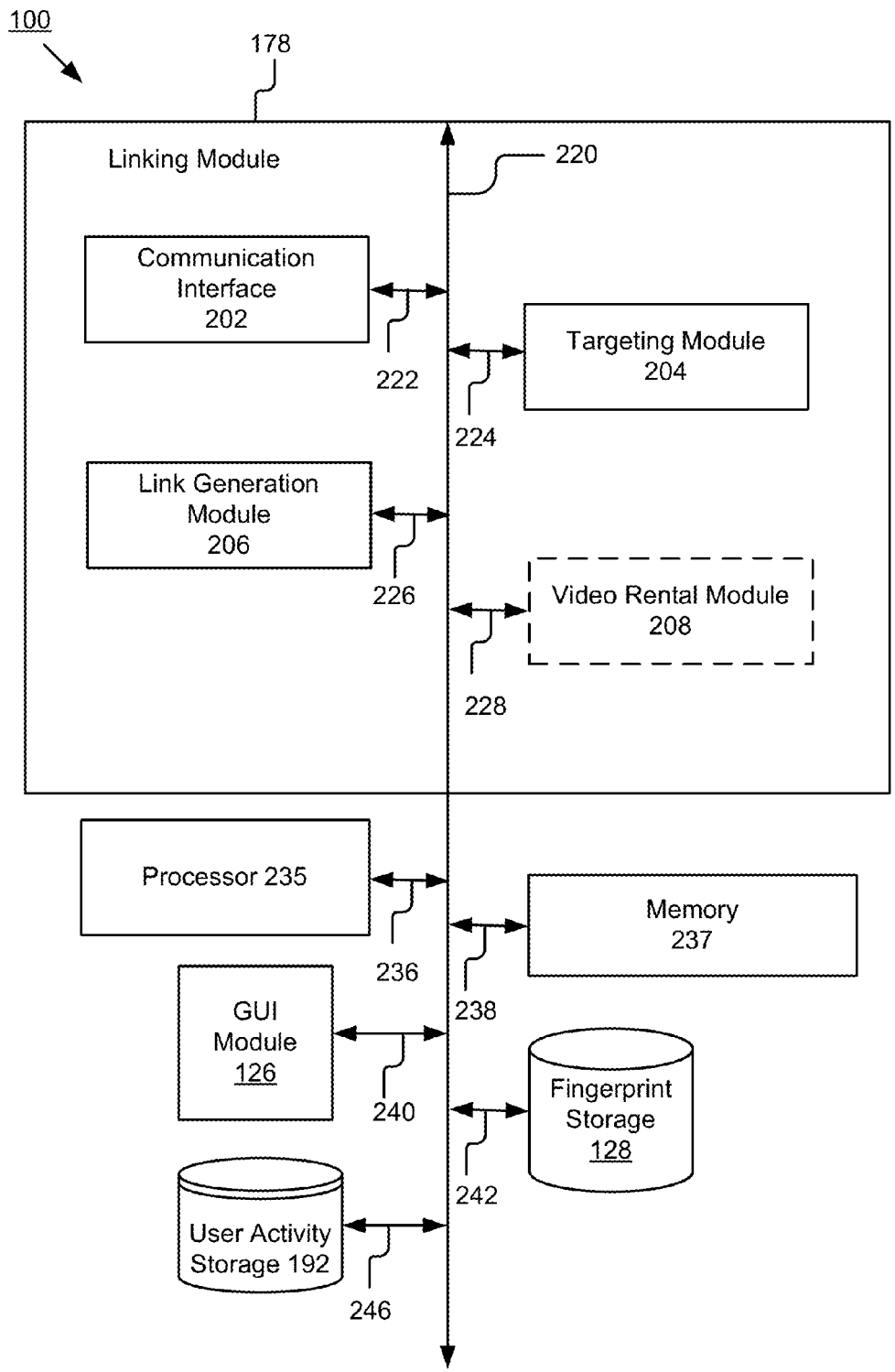
FIG. 2 is a block diagram illustrating one embodiment of an asset hosting site where a linking module is illustrated in detail.

Referring now to FIG. 2, depicted is an embodiment of the asset hosting site 100 showing the linking module 178 in more detail. Specifically. FIG. 2 depicts the linking module 178, a processor 235, a memory 237, the GUI module 126, the user activity storage 192 and the fingerprint storage 128. In one embodiment, the components of the asset hosting site 100 not depicted in FIG. 2 are stored in the memory 237. For example, the memory 237 stores one or more of the video serving module 104, the video search module 106, the upload server 108, the thumbnail generator 112 and optionally the monitor module 191.

In one embodiment, the processor 235 is a computer processor of the asset hosting site 100, and can be used to execute code and routines that comprise one or more of the video serving module 104, the video search module 106, the upload server 108, the thumbnail generator 112, the GUI module 126 and the linking module 178. The processor 235 comprises an arithmetic logic unit, a microprocessor, a general purpose controller or some other processor array to perform computations and execute the video serving module 104, die video search module 106, the upload server 108, the thumbnail generator 112, the GUI module 126 and the linking module 178. The processor 235 is coupled to the bus 220 for communication with the other components of the asset hosting site 100. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The memory 237 is a non-transitory storage medium. The memory 237 stores instructions and/or data that may be executed by the processor 235. For example, the memory 237 stores one or more of the modules of the asset hosting site 100 described above with reference to FIG. 1. The memory 237 is communicatively coupled to the bus 220 for communication with the other components of the asset hosting site 100. In one embodiment, the instructions and/or data stored on the memory 237 comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The memory 237 is communicatively coupled to the bus 220 via signal line 238. In one embodiment, the memory 237 stores the linking module 178 and the sub-modules 202, 204, 206 and 208 that are included in the linking module 178.

In one embodiment, the linking module 178 comprises a communication interface 202, a targeting module 204, a link generation module 206 and a video rental module 208. The video rental module 208 is depicted with a dashed line in FIG. 2 to indicate that it is an optional feature of the linking module 178.

The communication interface 202 includes code and routines for handling communications between the targeting module 204, the link generation module 206, the video rental module 208, the GUI module 126 and the other components of the asset hosting site 100. In one embodiment, the communication interface 202 is stored in the memory 237 and is accessible and executable by the processor 235. The communication interface 202 is adapted for cooperation and communication with the processor 235 and other components of the asset hosting site 100 via signal line 222. The communication interface 202 is communicatively coupled to the bus 220 via signal line 222.

In one embodiment, the communication interface 202 receives an uploaded content file from the upload server 108. The communication interface 202 delivers the uploaded content file to the targeting module 204. In another embodiment, the communication interface 202 receives a link to a target content file from the link generation module 206 and delivers the link to the GUI module 126.

The targeting module 204 includes code and routines for determining a target content file based at least in part on an uploaded content file. In one embodiment, the targeting module 204 is a set of instructions executable by the processor 235 to provide the functionality described below with reference to FIGS. 3 and 5-8B for determining a target content file based at least in part on an uploaded content file. In another embodiment, the targeting module 204 is stored in the memory 237 and is accessible and executable by the processor 235. In either embodiment, the targeting module 204 is adapted for determining a target content file based at least in part on an uploaded content file received via signal line 224. The targeting module 204 is communicatively coupled to the bus 220 via signal line 224.

In one embodiment, when a content provider 118 such as a publisher uploads a video to the asset hosting site 100, the content provider 118 also provides an input that either enables or disables linking other videos to the video uploaded by the content provider 118. These inputs are stored in the user enablement inputs 196. The targeting model 204 retrieves the enablement input from the user enablement inputs storage 196 and determines based on the input whether linking is enabled for a given video. The process of the targeting module 204 retrieving the enablement input from the user enablement inputs storage 196 and determining based on the input whether linking is enabled for a given video is referred to as an "enablement determination."

The targeting module 204 is described in further detail below with reference to FIGS. 3 and 5-8B.

The link generation module 206 includes code and routines for generating one or more links to a target content file. In one embodiment, a link is generated based at least in part on the enablement determination. For example, if the link generation module 206 receives a determination from the targeting module 204 indicating that the linking to the target content file is enabled, the link generation module 206 then generates a link to the target content file. If the link generation module 206 receives the determination indicating that the linking to the target content file is not enabled, the link generation module 206 does not generate the link accordingly.

In one embodiment, if the link generation module 206 generates the link to the target content file, the link generation module 206 transmits the link to the GUI module 126 via the communication interface 202. The GUI module 126 adds the link to one or more web pages playing the uploaded content file. If no link is generated, the link generation module 206 transmits a notice to the GUI module 126 via the communication interface 202 indicating that the linking is not enabled by the owner or the publisher of the target content file. The link generation module 206 is communicatively coupled to the bus 220 via signal line 226.

The video rental module 208 includes code and routines for renting a video to a user 125. In one embodiment, the video rental module 208 is a set of instructions executable by the processor 235 to provide the functionality described below for renting a video to a user 125. In another embodiment, the video rental module 208 is stored in the memory 237 and is accessible and executable by the processor 235. In either embodiment, the video rental module 208 is adapted for renting a video to a user 125 via signal line 228. The video rental module 208 is depicted in FIG. 2 using a dashed line to indicate that it is an optional feature of the linking module 178.

In one embodiment, the video rental module 208 rents a video to a user 125 and receives a rental fee paid by the user 125. The video rental module 208 monitors fees earned from different videos and stores this information in the memory 237.

The GUI module 126, the fingerprint storage 128 and the user activity storage 192 are described above with reference to FIG. 1, so that description will not be repeated here. The GUI module 126 is communicatively coupled to the bus 220 via signal line 240. The fingerprint storage 128 is communicatively coupled to the bus 220 via signal line 242. The user activity storage 192 is communicatively coupled to the bus 220 via signal line 246.

Targeting Module 204

Figure 3:
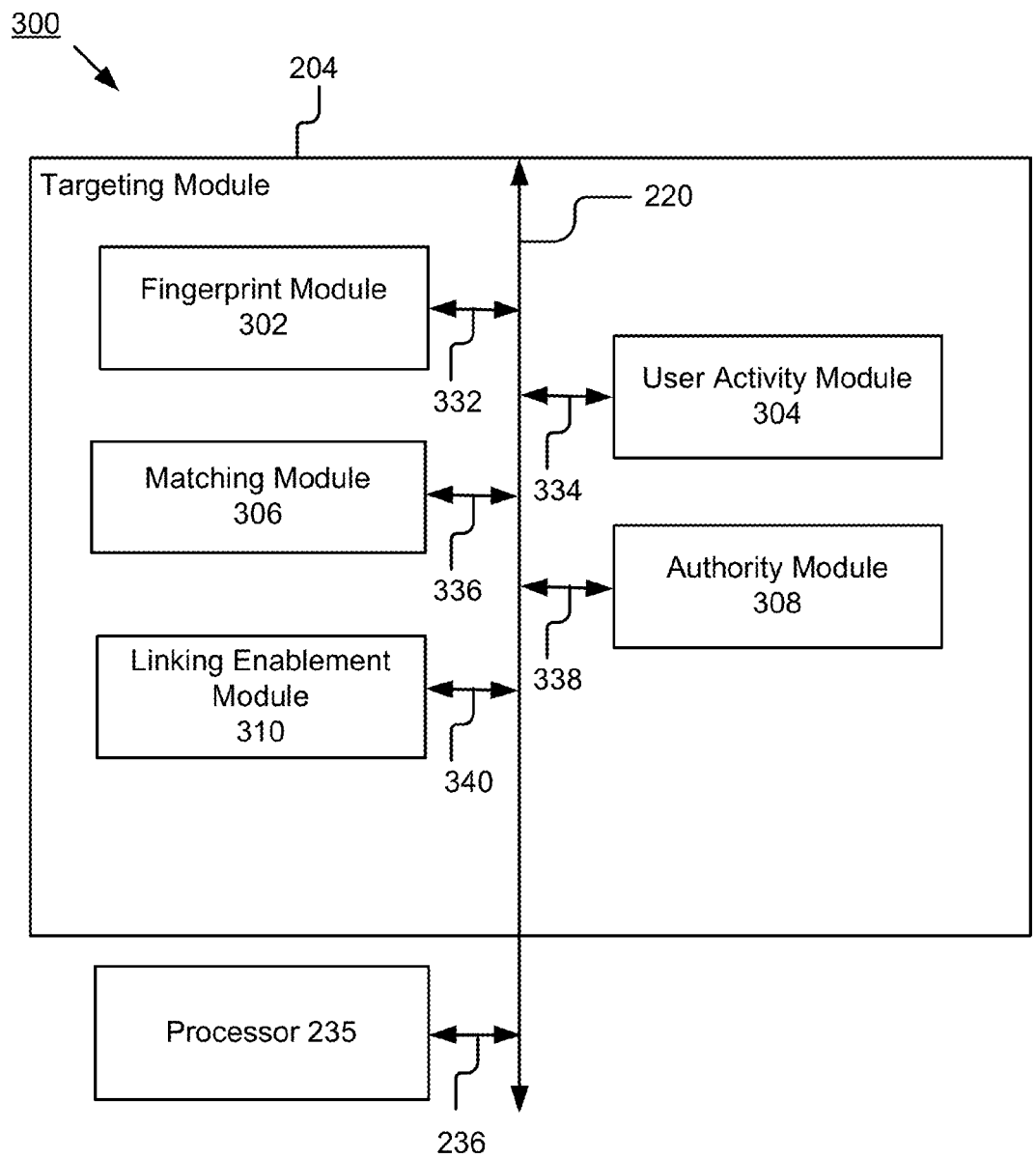
FIG. 3 is a block diagram illustrating one embodiment of a targeting module.

Referring now to FIG. 3, one embodiment of the targeting module 204 is shown in more detail. FIG. 3 is a block diagram 300 of one embodiment of the targeting module 204 that includes a fingerprint module 302, a user activity module 304, a matching module 306, an authority module 308 and a linking enablement module 310. This embodiment of the targeting module 204 is discussed in conjunction with FIG. 2. For example, FIG. 3 depicts the bus 220, processor 235 and signal line 236 previously described with reference to FIG. 2, so the description of these elements will not be repeated here. The fingerprint module 302 is communicatively coupled to the bus 220 via signal line 332. The user activity module 304 is communicatively coupled to the bus 220 via signal line 334. The matching module 306 is communicatively coupled to the bus 220 via signal line 336. The authority module 308 is communicatively coupled to the bus 220 via signal line 338. The linking enablement module 310 is communicatively coupled to the bus 220 via signal line 340. The fingerprint module 302, the user activity module 304, the matching module 306, the authority module 308 and the linking enablement module 310 communicate with the other components of the asset hosting site 100 via the bus 220.

The fingerprint module 302 includes code and routines that, when executed by processor 235, generates one or more fingerprints for an uploaded content file (e.g., a video file) and stores generated fingerprints in the fingerprint storage 128. The fingerprint is data that is an identifier of the uploaded content file. For example, the fingerprint is data such as an audio signature or a combination of an audio signature and a video signature for a video file. Other fingerprints are known in the art.

The uploaded content file can be any type of content file. For example, an uploaded content file includes one or more UGVCs such as clips, homage videos, parodies and any other short form videos that are uploaded by users 125. The fingerprint identifies the uploaded content file. In one embodiment, the uploaded content file also includes one or more of canonical music videos, interviews and trailers that are uploaded by content providers 118. In one embodiment, one or more of the canonical music videos, interviews and trailers are related to a target content file (e.g., a long form video such as a full version movie).

In one embodiment, the fingerprint module 302 also generates fingerprints for long form content files, such as full version movies, shows, television programs, etc. The fingerprint module 302 transmits generated fingerprints to the fingerprint storage 128 and stores the fingerprints there for future use.

In one embodiment, the fingerprint module 302 generates fingerprints for uploaded content files periodically at a pre-determined time interval (such as, an hour, a day, a week, etc.). For example, the fingerprint module 302 analyzes the uploaded video files and generates the fingerprints for the video files in batches. In another embodiment, the fingerprint module 302 generates a fingerprint for an uploaded content file contemporaneous to the uploading of the content file by a user 125 or a content provider 118.

The user activity module 304 includes code and routines that, when executed by the processor 235, retrieves data describing user activity in relation to the uploaded content file (e.g., social data) from the user activity storage 192 and analyzes the data to determine data describing the target content file (e.g., metadata such as a title of the target content file). For example, the user activity module 304 retrieves data describing user activity regarding a video file included on one or more third party sites 186 (such as social network sites, blog websites, microblog websites, messaging boards, e-mail services, video hosting sites, etc.) and other video hosting sites such as the asset hosting site 100 (as described above with reference to the user activity storage 192). The data can describe, for example, comments, blog and microblog posts and video responses made by one or more users 125 with reference to a video file. The data can also include profile information and registration information of a user 125 who uploaded the video file.

In one embodiment, the user activity module 304 retrieves data describing the user's 125 onsite activity (e.g., onsite searches and onsite activity history) before, during and after viewing a video file. In one embodiment, the data retrieved by the user activity module 304 includes metadata associated with the uploaded content file, such as metadata describing a title, an artist, an actor/actress, a director, a band, an upload entity that uploaded the content file, a tag, etc.

The user activity module 304 analyzes the retrieved data that is associated with the uploaded content file. In one embodiment, the user activity module 304 determines one or more topics and/or one or more keywords from the data associated with the uploaded content file. The user activity module 304 maps videos to the topics and/or keywords. If there is a mapping between a video and at least one of the topics and/or keywords, the user activity module 304 determines the video as one target content file. In this way, the user activity module 304 determines one or more target content files.

Assume, for example, that a long form movie exists and is titled "Space Aliens Attack Mountain View" and that video data for this movie is stored in the video database 116. Clips and other short form content files related to this movie are also stored in the video database. A user 125 is on an asset hosting site 100 and posts a comment (or shares a comment) for a short form video that states "This is my favorite scene from the movie 'Space Aliens Attack Mountain View'!" From the keyword/topic in the comment, the user activity module 304 determines that there is a mapping to the movie "Space Aliens Attack Mountain View." Therefore, the user activity module 304 determines the long form version of the movie as the target content file. In one embodiment, the user activity module 304 analyzes tens, hundreds or even thousands of user inputs such the above described comment and determines the long form version of the movie as the target content file. In one embodiment, the user activity module 304 analyzes tens of different types of user inputs and determines the long form version of the movie as the target content file. The user activity module 304 transmits metadata describing the target content file, such as the title of the movie, to the matching module 306.

In one embodiment, the target content file includes other related content files as well as the long form content file. For example, a long form or full version movie is determined as a target content file. A trailer of the full version movie, an interview of an actor in the movie and other videos in relation to the full version movie are also determined as target content files. Furthermore, other short form videos and clips related to the uploaded content file are determined as target content files.

In one embodiment, the user activity module 304 retrieves data describing user activities in relation to one or more uploaded content files from the user activity storage 192 and analyzes the retrieved data periodically at an interval (such as, an hour, a day, a week, etc.) defined by an administrator of the asset hosting site 100. In another embodiment, the user activity module 304 retrieves data describing user activities in relation to an uploaded content file from the user activity storage 192 and analyzes the retrieved data contemporaneous to the uploading of the content file by a user 125 or a content provider 118. The user activity module 304 is described in more detail below with reference to FIG. 7.

The matching module 306 includes code and routines that, when executed by the processor 235, determines one or more target content files matching an uploaded content file. In other words, for a given uploaded content file (e.g., a short form video file), the matching module 306 determines one or more target content files (e.g., one or more long form video files) related to the uploaded content file. For example, the uploaded content file is a UGVC, e.g., with a title "Favorite action movies" including three clips from three different action movies that are the user's 125 favorites. Accordingly, the matching module 306 determines the three full version action movies as target content files.

In one embodiment, the matching module 306 determines one or more matching target content files by searching and identifying matching fingerprints. For example, a user 125 uploads a short form video file (e.g., any type of UGVC) to the asset hosting site 100. The fingerprint module 302 generates a first fingerprint for the uploaded short form video file and communicates with the matching module 306 to transmit the generated fingerprint to the matching module 306. The matching module 306 receives a first fingerprint for the uploaded content file and queries the fingerprint storage 128 for existing fingerprints matching the first fingerprint. Based at least in part on one or more of the existing fingerprints matching the first fingerprint, the matching module 306 determines one or more matching target content files (such as, a full version movie from which the clip was taken) for the uploaded content file.

In another embodiment, the matching module 306 determines one or more matching target content files based at least in part on one or more determinations of the user activity module 304. For example, the matching module 306 receives a title of a full version movie from the user activity module 304 and determines it as the target content file. In yet another embodiment, the matching module 306 determines the matching target content file based on both fingerprints matching and one or more determinations of the user activity module 304.

In one embodiment, the matching module 306 queries the video database 116 for the matching target content file (such as a full version movie and various videos related to the full version movie) after determining the matching target content file. In one embodiment, the matching module 306 queries the video database 116 to identify all the matching video files uploaded by the users 125 (i.e., videos having the same content as the matching target content files).

If the matching module 306 fails to find a matching target content file in the video database 116 or there is no matching target content file in the video database 116, then the matching module 306 searches the video database 116 for other related videos. For example, a short form video is related to a long form video of an episode of a television show, and the episode is not stored in the video database 116. In this case the matching module 306 searches the video database 116 for other related videos, such as other episodes from the same show. In another example, a first video is related to a second video. The second video is a better quality version of the first video (e.g., a high definition version of the first video) and/or a monetizable version of the first video (e.g., a video rental).

The matching module 306 transmits the matching results to the GUI module 126, In one embodiment, the matching results are any combination of a long form video related to the short form uploaded video (e.g., a full version movie, an episode of a television show, etc.) and various other videos related to the long form video (e.g., trailers, interviews, etc.). In one embodiment, the matching module 306 also transmits the results to the authority module 308 and the linking enablement module 310.

The authority module 308 includes code and routines that, when executed by the processor 235, determines a territory limitation for a target content file. For example, a user 125*a* uploads a first video file and indicates that the first video can only be viewed by other users 125 in certain geographic territories. The geographic territory of a user 125 is identifiable by the authority module 308, for example, by the internet protocol ("IP") address of the user 125. The uploading user 125*a* also uploads other versions of the first video file (one or more other versions of the first video file are referred to collectively as the second video) and indicates that they are viewable by other users 125 in territories different than those identified for the first video. By way of example, the first video is indicated as viewable by users 125 in the United States and Canada, but the second video is indicated as viewable by users 125 in Mexico and Honduras.

The authority module 308 analyzes the target content files and determines the territorial limitations for the target content files. In one embodiment, the authority module 308 queries the video database 116 for one or more video files that (1) have content that is the same as the target content file and (2) have territorial limitations that are different than that of the target content file. In this way the authority module 308 identifies different content files having the same content but different territorial limitations.

For example, assume that a user 125*n* is located in a specific geographic territory, such as in the United Kingdom. Further assume that the target content file is determined to have a territorial limitation of being viewable only in the United States and Canada. Since the user 125*n* is in the United Kingdom, the authority module 308 identifies an alternative target content file that has the same content as the target content file and has a different territorial limitation that allows it to be viewed in the United Kingdom.

In one embodiment, the authority module 308 identifies in the video database 116 one or more content files that have the same content as the target content file so that links for maximum number of territories can be generated later by the link generation module 206. For example, the authority module 308 identifies all the content files that have the same content as the target content file, identifies the territories in which these files can be played, and generates at least one link per identified territory. These links are then embedded in one or more web pages including a playable version of the uploaded content file.

In one embodiment, the authority module 308 also determines if the target content file is a private file or a public file. A private file is a file (e.g., a video file) that is uploaded by an uploading entity such as a content provider 118 or a user 125 and identified by the uploading entity as being private and not authorized for viewing by others. In one embodiment, the authority module 308 identifies a content identifier (content ID) such as a video ID for the target content file in the video database 116. The authority module 308 uses the content ID as an index to check if the content file is specified by its uploading entity as being private.

If the authority module 308 determines that the target content file is a private file, the authority module 308 identifies an alternative public target content file having content that is the same as the private file. For example, the authority module 308 identifies an input by the user 125 (or the content provider 118) specifying that the target video file is private. The authority module 308 queries the video database 116 to identity a public video file having the same content as the private target video file.

In one embodiment, the authority module 308 transmits to the linking enablement module 310 one or more public target content files that have territorial limitations applicable to a user 125 who requests a GUI showing an uploaded content file on a client device 115.

The linking enablement module 310 includes code and routines that, when executed by the processor 235, retrieves the linking inputs from the user enablement inputs storage 196 and determines if the linking is enabled. For example, the authority module 308 determines a public target content file that has an applicable territorial limitation, the linking enablement module 310 queries the user enablement inputs 196 and determines whether linking to the public target content file is enabled by its owner. In another example, the linking enablement module 310 implements the above steps after the matching module 306 determines a matching target content file.

Graphical User Interface Engine 126

Figure 4A:
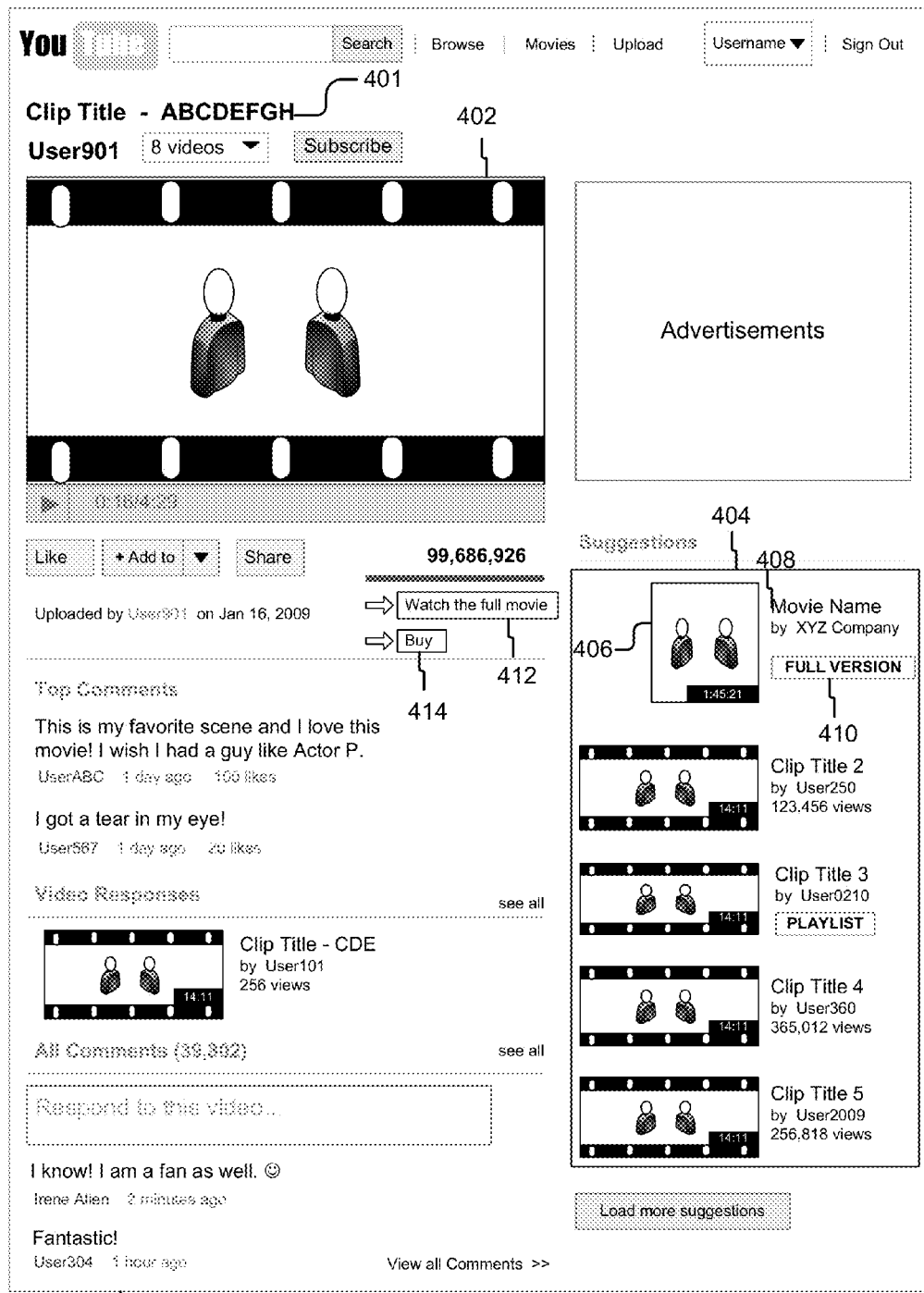
FIG. 4A is a graphic representation of a user interface that is generated by a GUI module for playing an uploaded content file.

FIG. 4A is a graphic representation 400 of a user interface that is generated by the GUI module 126 for playing an uploaded content file according to one embodiment.

Element 410 is a graphic depicting the title of the uploaded content file and the name of the user 125 who uploaded the content file (e.g., "Clip Title—ABCDEFGH"). Element 402 is a window for displaying the playback of the content file such as an uploaded content file.

Element 404 is a graphical window for displaying one or more suggestions. The suggestions include content related to the uploaded content file being played back in element 402. For example, the suggestions include one or more of a full version movie (i.e., the target content file for the uploaded content file of element 402) and various other related content files (e.g., other UGVCs, trailers, interviews, etc.). Element 406 is a movie poster graphic 406 for the target content file. Element 408 is a graphical representation of the name of the full version movie included in the target content file. Element 410 is a full version movie button 410 clickable by a user to cause playback of the target content file. In one embodiment, the movie poster graphic 406, the movie name 408 and the full version button 410 are linked to a web page for viewing a full version movie. For example, if a user 125 clicks any of the movie poster graphic 406, the movie name 408 and the full version button 410, the asset hosting site 100 redirect the user 125 to a webpage where they can view the full version movie. In one embodiment, the user 125 pays a fee before being able to view the full version movie.

Elements 412 and 414 are graphical buttons. If a user 125 clicks the watch the full movie button 412, the user 125 is redirected to a second web page showing information describing the full version movie similar to elements 406, 408 and 410. If the buy button 414 is clicked by a user 125, the user 125 is redirected to a third website where the user can provide information to purchase a copy of the target content file (e.g., purchase the full version movie) or a pass to rent the target content file (e.g., purchase a pass to rent the full version movie for a period of time). In one embodiment, the third website is hosted by the third party server 182.

Figure 4B:
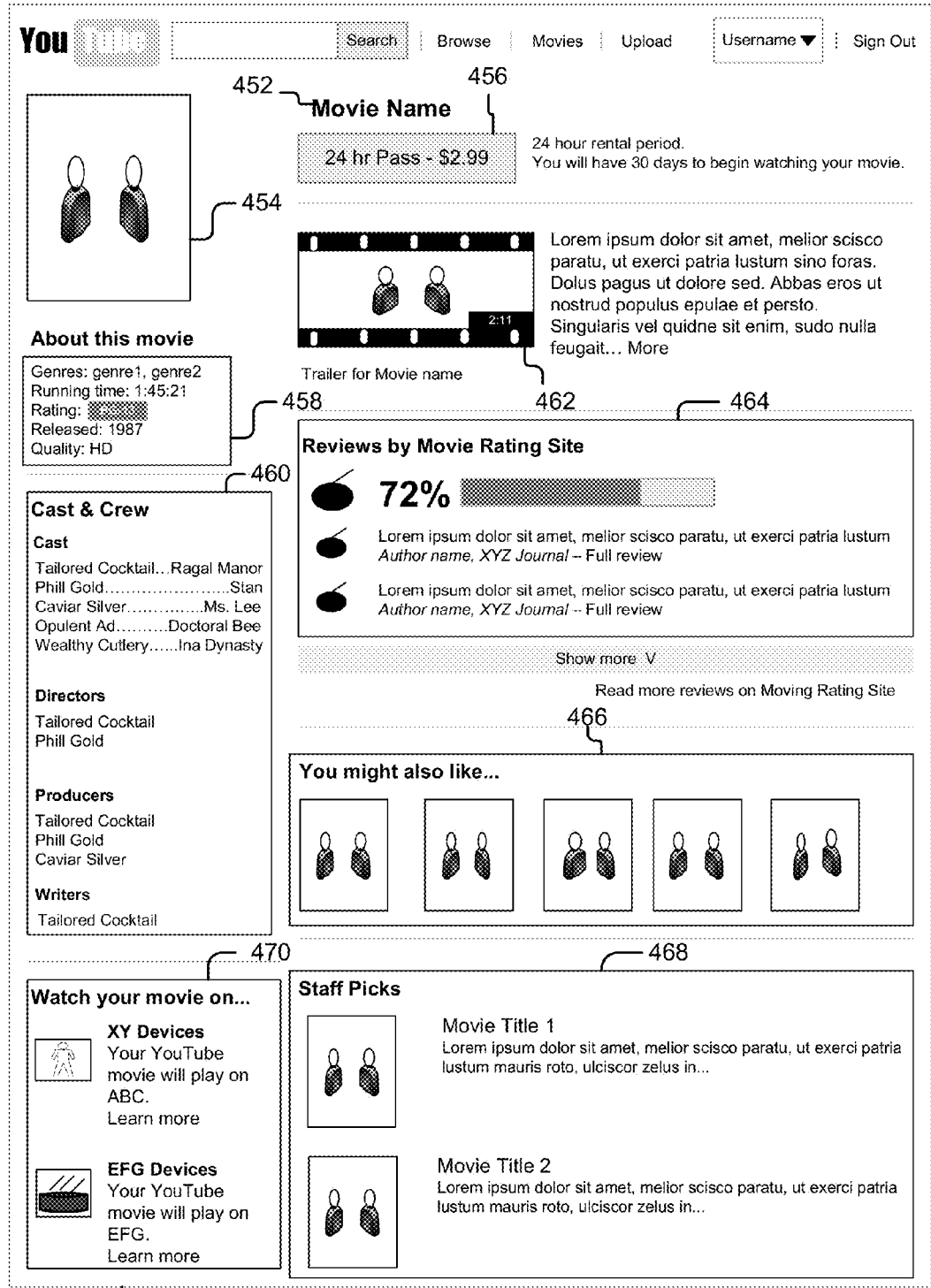
FIG. 4B is a graphic representation of a user interface that is generated by a GUI module for displaying information describing a long form or full version movie.

FIG. 4B is a graphic representation 450 of another user interface according to one embodiment. The user interface depicted in FIG. 4B is displaying information describing a long form or full version movie. Element 452 is a graphical representation of the movie name. Element 454 is a graphical representation of a poster for the movie. Element 456 is a graphical button clickable by a user 125 to purchase a 24 hour pass for renting the movie.

Element 458 is a graphical window depicting various information describing the movie. For Example, element 458 depicts the genre of the movie, the running time of the movie, the rating for the movie, the year the movie was released and the image quality of the movie. Element 460 is a graphical window describing production information for the movie. For example, element 460 depicts one or more cast members for the movie, one or more directors for the movie, one or more producers for the movie and one or more writers for the movie.

Element 462 is a widow for playback of a trailer for the movie. Element 464 is a graphical window depicting one or more movie reviews for the movie. Element 466 a graphical window depicting one or more content files that the user 125 may like based on various information about the user 125, including, for example, social data for the user 125. Element 468 is a graphical window describing one or more movies selected by an administrator of the asset hosting site 100. For example, element 468 depicts one or more movies that the user 125 may like based on their interest in the movie described by the movie name 452.

Methods

FIGS. 5-8B depict various methods 500, 600, 700 and 800 performed by the system described above with reference to FIGS. 1-3.

Figure 5:
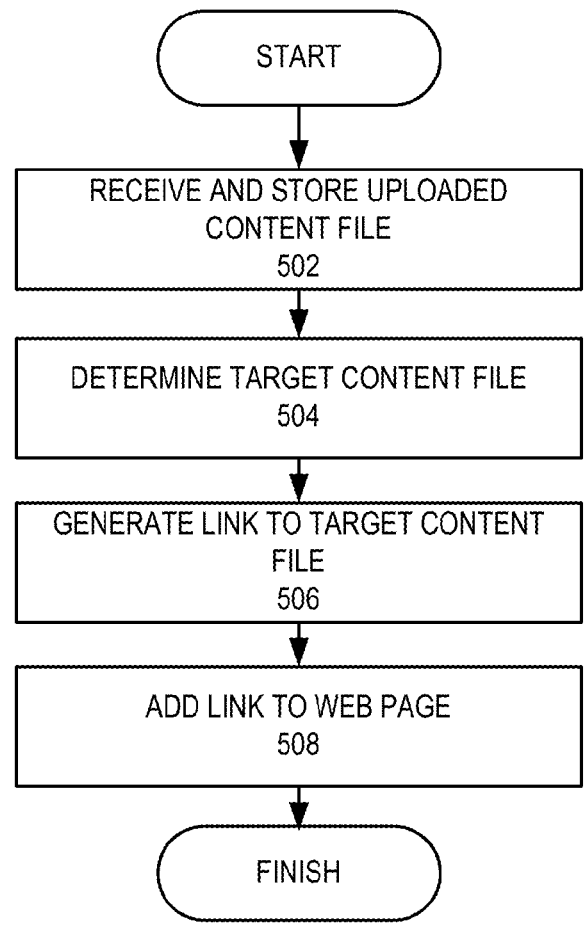
FIG. 5 is a flow diagram of one embodiment of a method for linking content files.

FIG. 5 is a flow diagram depicting one embodiment of a method 500 for linking content files. The upload server 108 receives and stores 502 an uploaded content file. For example, the uploaded server 108 receives a short form video from a user 125 of a client device 115 or from a content provider 118. The uploaded server 108 stores the short form video in the video database 116. In one embodiment, the uploaded content file is a UGVC, such as a clip, a homage video, a parody, etc.

At step 504, the targeting module 204 determines one or more target content files. In one embodiment, the targeting module 204 determines a group of target content files for a group of uploaded content files periodically at a pre-determined interval. In another embodiment, the targeting module 204 determines a target content file for an uploaded content file contemporaneous to the receiving of the uploaded content file.

At step 506, the link generation module 206 generates one or more links to the target content file. For example, the link generation module 206 receives a determination from the targeting module 204. If the determination indicates that the linking to the target content file is enabled, the link generation module 206 then generates a link to the target content file. If the determination indicates that the linking to the target content file is not enabled, the link generation module 206 does not generate the link accordingly.

At step 508, the GUI module 126 adds the link to one or more web pages. For example, the GUI module 126 generates a web page that includes a playable version of the uploaded content file. The GUI module 126 then includes the link to either side of the playable version of the uploaded content file on the web page. In one embodiment, the link on the web page is clickable by the users 125 for their viewing, renting or purchasing the target content file.

Figure 6:
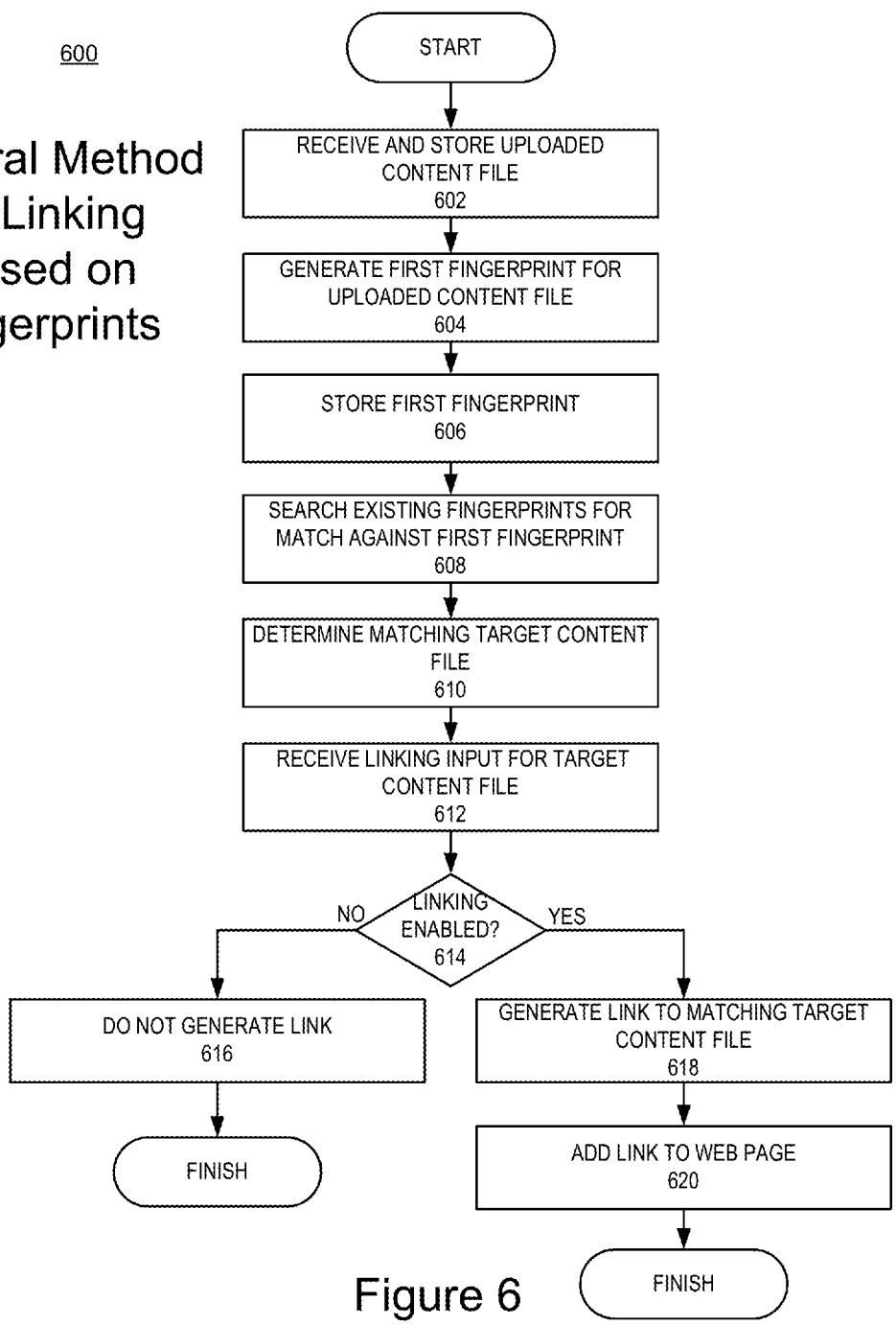
FIG. 6 is a flow diagram of another embodiment of a method for linking content files.

FIG. 6 is a flow diagram depicting another embodiment of a method 600 for linking content files. The upload server 108 receives and stores 602 an uploaded content file. For example, the uploaded content file is a short form video, such as a clip, a homage video, a parody, a trailer, an interview of an actor/actress, etc. In one embodiment, the upload server 108 stores the uploaded content file in the video database 116.

At step 604, the fingerprint module 302 generates a first fingerprint for the uploaded content file. For example, the uploaded content file is a video clip. The fingerprint module 302 analyzes the uploaded video clip and generates a first fingerprint for the video clip. In one embodiment, the fingerprint module 302 also generates one or more fingerprints for one or more content files such as video files stored in the video database 116. At step 606, the fingerprint module 302 stores the first fingerprint in the fingerprint storage 128.

At step 608, the matching module 306 searches existing fingerprints for a match against the first fingerprint. In one embodiment, the matching module 306 searches existing fingerprints stored in the fingerprint storage 128 for one or more fingerprints matching the first fingerprint. At step 610, the matching module 306 determines a matching target content file based at least in part one the existing fingerprints matching the first fingerprint. In one embodiment, the matching target content file has a fingerprint matching the first fingerprint. In another embodiment, the matching module 306 determines more than one matching target content files that have fingerprints matching the first fingerprint.

At step 612, the linking enablement module 310 receives one or more linking inputs for the matching target content file from the user enablement inputs 196. A linking input indicates whether the publisher or the owner (e.g., a content provider 118, a user 125) of the target content file has an authorized linking to the matching target content file. If more than one matching target content files have been determined by the matching module 306 at step 610, the linking enablement module 310 receives linking inputs for the more than one matching target content files.

At step 614, the linking enablement module 310 determines whether the linking is enabled based at least on the one or more linking inputs. If the linking is not enabled (i.e., the owner or the publisher does not have an authorized linking to the matching target content file), then the method 600 proceeds to step 616. At step 616, the link generation module 206 does not generate a link to the matching target content file.

If the linking is enabled (i.e., the owner or the publisher has at least one authorized linking to the matching target content file), then the method proceeds to step 318. At step 318, the link generation module 206 generates a link to the matching target content file. At step 320, the GUI module 208 adds the link to a web page. For example, the GUI module 208 generates a web page for playing the uploaded content file. The GUI module 126 includes the link to the web page for playing the uploaded content file.

Figure 7:
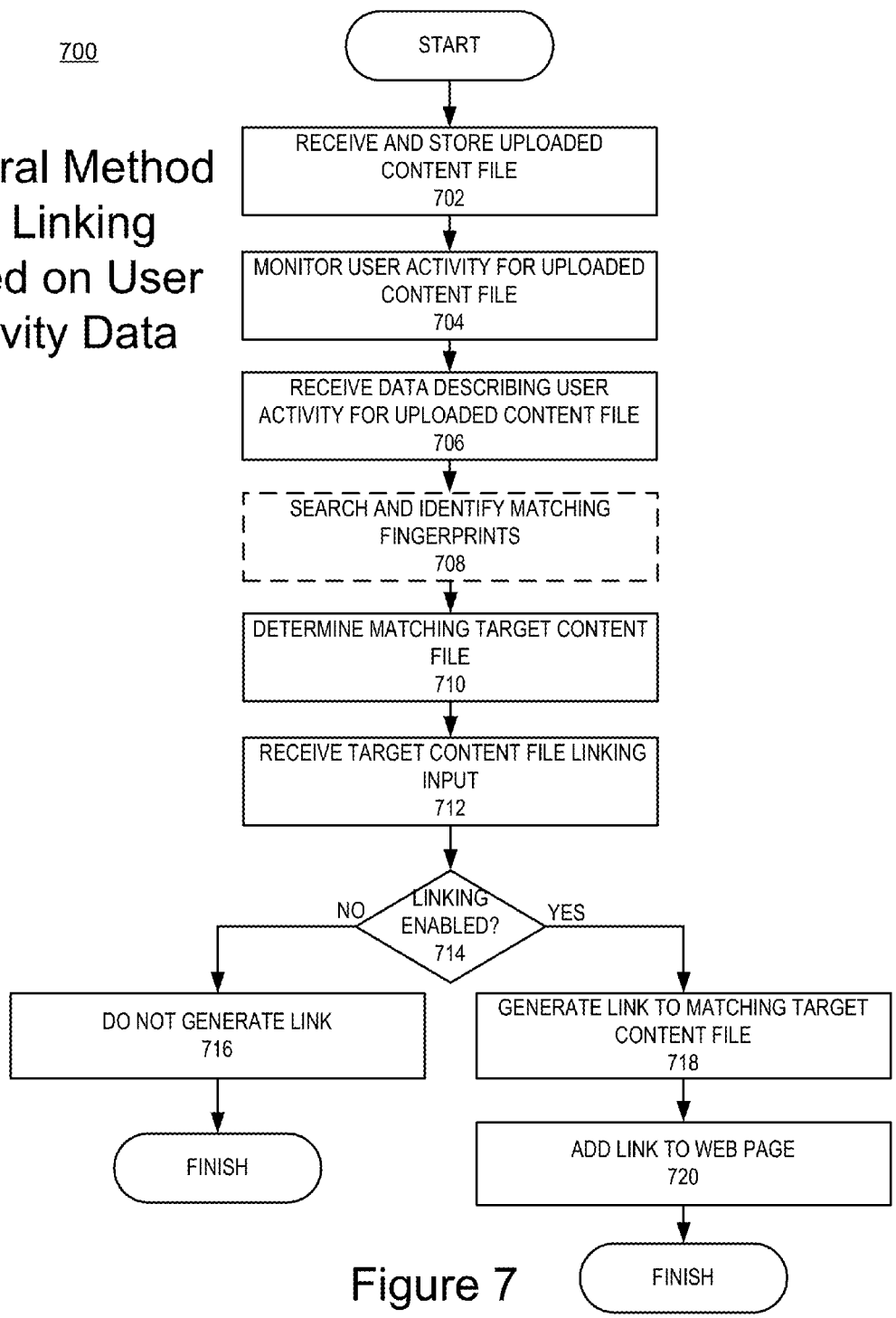
FIG. 7 is a flow diagram of one embodiment of a method for linking content files based on data that describes user activity.

FIG. 7 is a flow diagram depicting one embodiment of a method 700 for linking content files based on data that describes user activity. The upload server 108 receives and stores 702 an uploaded content file. At step 704, the monitor module 191 monitors user activity for the uploaded content file. In one embodiment, the monitor module 191 stores data describing the user activities at the user activity storage 192. For example, the data describes user activities on social network sites, blog sites, microblog sites and video hosting sites. In another example, the data also includes websites visited by users 125 before, during and after viewing the uploaded content file, a history of websites visited by viewers 125 and searches done by users 125 before, during and after viewing the uploaded content file.

At step 706, the user activity module 304 retrieves data describing user activities in relation to the uploaded content file from the user activity storage 192.

At step 708, the matching module 306 searches the fingerprint storage 128 and identifies one or more existing fingerprints that match the fingerprint for the uploaded content file. Step 708 is depicted in FIG. 7 using a dotted line to indicate that it is an optional feature of the method 700.

At step 710, the user activity module 304 determines one or more matching target content files. In one embodiment, the user activity module 304 analyzes the data describing user activities in relation to the uploaded content file and determines a matching target content file. For example, the user activity module 304 parses comments for an uploaded video clip and determines that the uploaded video clip is related to a long form version of a movie. For example, the uploaded content file is a clip made from a long form version of a movie and a comment for the clip states "Wow, this clip is from 'Aliens Attack Mountain View.'" The user activity module 304 therefore determines based at least in part on the keyword of this comment that the clip is related to the long form version of the movie "Aliens Attack Mountain View." The user activity module 304 then determines the long form version of the movie "Aliens Attack Mountain View" as the matching target content file.

At step 712, the linking enablement module 310 receives one or more target content file linking inputs. At step 714, the linking enablement module 310 determines whether the linking is enabled by the publisher or owner of the matching target content file according to the one or more linking inputs. If the linking is not enabled, then the method 700 proceeds to step 716.

At step 716, the link generation module 206 does not generate a link to the matching target content file. If the linking is enabled, then the method proceeds to step 718.

At step 718, the link generation module 206 generates a link to the matching target content file. At step 720, the GUI module 126 adds the link to a web page. In one embodiment, the GUI module 126 adds the link to a web page for playing the uploaded content file. In another embodiment, the GUI module 126 adds the link to a web page including a target content file pipeline.

Figure 8A:
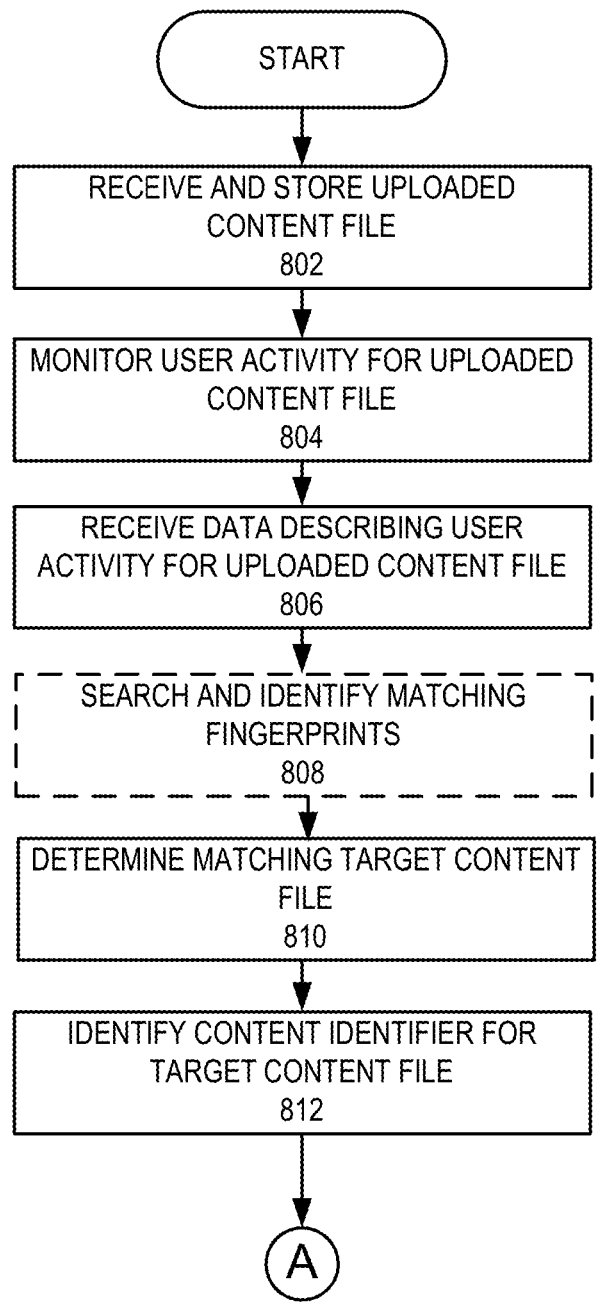
FIGS. 8A-8B are flow diagrams of one embodiment of a method for generating links of content files for different territories.
Figure 8B:
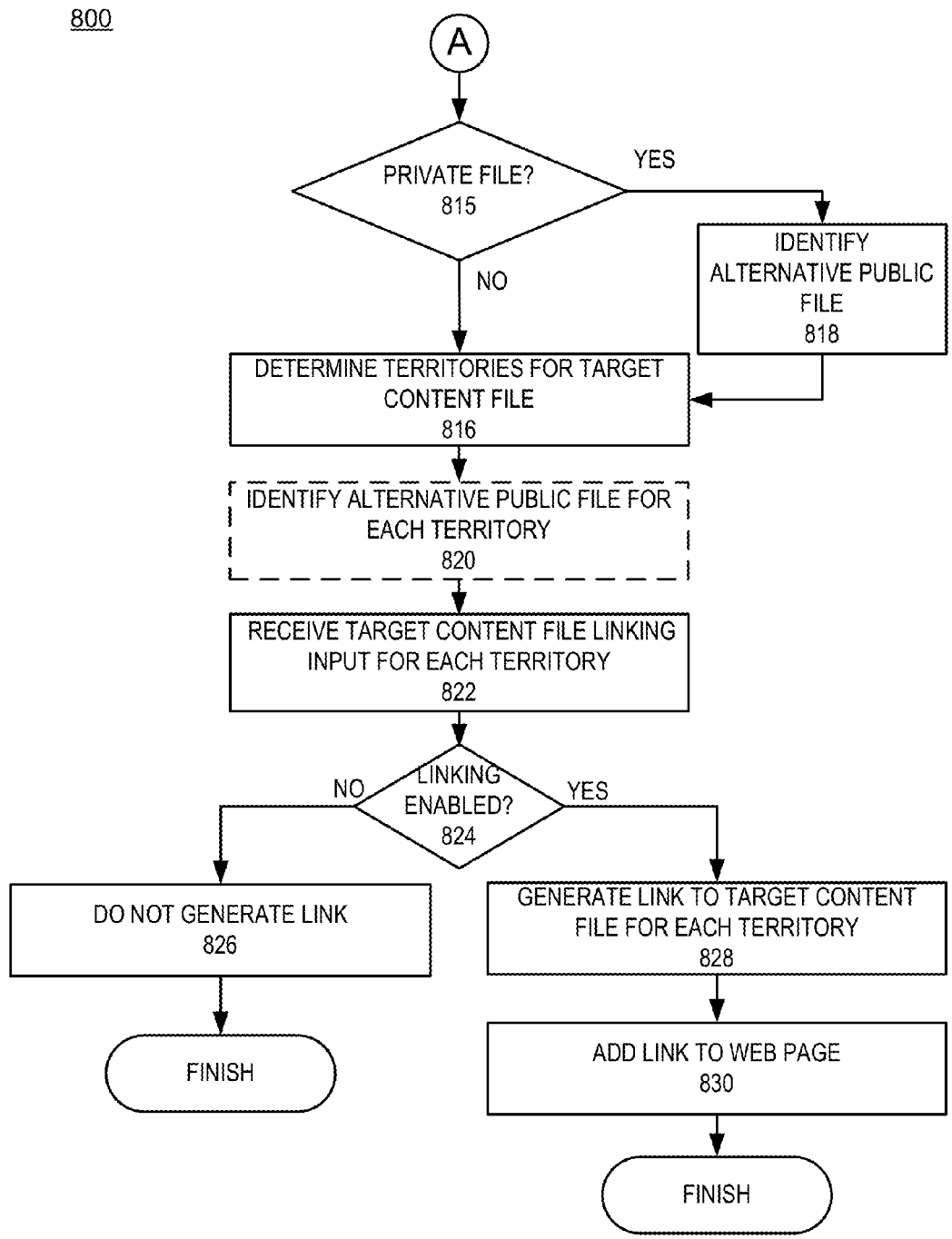

FIGS. 8A-8B are flow diagrams depicting one embodiment of a method 800 for generating links of content files for different territories. The method 800 also starts with that the upload server 108 receives and stores 702 an uploaded content file. At the following steps 804-810, the method 800 is the same as that described above in the method 700 with reference to steps 704-710. Accordingly, this description will not be repeated here.

At step 812, the authority module 308 identifies content identifier (content ID) for the target content file. For example, the authority module 308 identifies a video ID for a target video file by querying the video database 116. At step 815, the authority module 308 determines whether the target content file is a private file or a public file. For example, the authority module 308 queries the video database 116 using a video ID for the target video file as the search criteria and retrieves the specification of the target video file. Based on the specification, the authority module 308 determines if the target video file is specified by its owner or publisher as a public file. If the target content file is a public file, the method 800 proceeds to step 816.

At step 816, the authority module 308 determines territories for the target content file. For example, the authority module 308 analyzes the IP address of the user 125 who requests to view the uploaded content file and determines the geographic territory of the user 125, such as in the United States. In one embodiment, the authority module 308 also determines a territorial limitation for the target content file, such as a territorial limitation that allows the target content file to be viewable to the users 125 in the United Kingdom.

If the target content file is a private file, the method 800 proceeds to step 818. At step 818, the authority module 308 identifies an alternative public file in the video database 116 and then the method 800 proceeds to step 816. The alternative public file has the same content as the private file.

At step 820, the authority module 308 identifies one or more alternative public files for each territory. In one embodiment, if the territorial limitation for the target content file (such as being viewable in the United Kingdom) is not applicable to the geographic territory of the user 125 (such as the in the United States), the authority module 308 identifies an alternative public target content file with a applicable territorial limitation (such as being viewable in the United States) in the video database 116.

In another embodiment, the authority module 308 identifies one or more alternative public files with territorial limitations other than the territorial limitation of the target content file in order for more users 125 to view the same content as that of the target content file. For example, the public content files for different territories are different, although they have the same contents. Assume the public target content file is viewable to the users 125 in United Kingdom. The authority module 308 identifies an alternative public file for the users 125 in the United States and Canada. Therefore the authority module 308 determines the alternative public target content file to enlarge the number of viewers. The step 820 is depicted in FIG. 8B using a dotted line to indicate that it is an optional step of the method 800.

At step 822, the linking enablement module 310 receives one or more target content file linking inputs for each territory. At step 824, the linking enablement module 310 determines whether the linking to the target content file for each territory is enabled by the publisher or owner according to the one or more linking inputs. If the linking to the target content file for a territory is not enabled, then the method 800 proceeds to step 826.

At step 826, the link generation module 206 does not generate a link to the target content file for the territory. If the linking to the target content file for a territory is enabled, then the method 800 proceeds to step 828.

At step 828, the link generation module 206 generates a link to the target content file for the territory. At step 830, the GUI module 126 adds the link to a web page. In one embodiment, the GUI module 126 adds the link to a web page for playing the uploaded content file. In another embodiment, the GUI module 126 adds the link to a web page including a target content file pipeline.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
analyzing, by a processor, data that describes user activity for an uploaded content file to obtain a statistical pattern, the uploaded content file relating to a target content file and the data comprising social data that comprises comments for the uploaded content file;
identifying, by the processor, the target content file related to the uploaded content file based on the analysis of the data comprising the comments and on the statistical pattern, wherein the target content file comprises one or more of a movie, a show, or a television program and the uploaded content file comprises user-generated video content;
generating, by the processor, a link to the target content file in response to identifying the target content file related to the uploaded content file; and
generating a new user interface document for the target content file, the new user interface document including a playable version of the uploaded content file and the link to the target content file.

2. The method of claim 1, wherein the uploaded content file further comprises one or more of a trailer and an interview.

3. The method of claim 2, wherein the user activity further comprises an activity on one or more of a social network site, a blog site, a microblog site, a messaging board, an electronic mail service and a video hosting site.

4. The method of claim 1, wherein the data that describes user activity further comprises one or more of websites visited by a user before and after viewing the uploaded content file and searches done by a user before and after viewing the uploaded content file.

5. The method of claim 1, wherein identifying the target content file further comprises:
generating a first fingerprint for the uploaded content file;
searching existing fingerprints for a match against the first fingerprint; and
determining the target content file based at least in part on the match.

6. The method of claim 1 further comprising:
determining a territorial limitation for the target content file; and
identifying an alternative target content file based at least in part on the territorial limitation.

7. The method of claim 1 further comprising:
determining whether the target content file is private; and
identifying an alternative target content file responsive to a determination that the target content file is private.

8. The method of claim 1 further comprising:
determining whether an owner of the target content file has an authorized linking to the target content file based at least in part on a linking input.

9. The method of claim 1, wherein the uploaded content file further comprises one or more of a video clip, a homage video and a parody, and wherein the target content file comprises a full version movie.

10. A system comprising:
a non-transitory memory;
a processor of a computing device communicably coupled to the non-transitory memory, the processor to execute instructions to:
analyze data that describes user activity for an uploaded content file to obtain a statistical pattern, the uploaded content file relating to a target content file and the data comprising social data that comprises comments for the uploaded content file;
identify the target content file related to the uploaded content file based on the analysis of the data comprising the comments and on the statistical pattern, wherein the target content file comprises one or more of a movie, a show, or a television program and the uploaded content file comprises user-generated video content;
generate a link to the target content file in response to identifying the target content file related to the uploaded content file; and
generate a new user interface document for the target content file, the new user interface document including a playable version of the uploaded content file and the link to the target content file.

11. The system of claim 10, wherein the uploaded content file further comprises one or more of a trailer and an interview.

12. The system of claim 11, wherein the user activity further comprises an activity on one or more of a social network site, a blog site, a microblog site, a messaging board, an electronic mail service and a video hosting site.

13. The system of claim 10, wherein the data that describes user activity further comprises one or more of websites visited by a user before and after viewing the uploaded content file and searches done by a user before and after viewing the uploaded content file.

14. The system of claim 10, wherein to identify the target content file the processor is to:
generate a first fingerprint for the uploaded content file;
search existing fingerprints for a match against the first fingerprint; and
determine the target content file based at least in part on the match.

15. The system of claim 10, wherein to identify the target content file the processor is to:
determine a territorial limitation for the target content file; and
identify an alternative target content file based at least in part on the territorial limitation.

16. The system of claim 10, wherein the processor to determine whether the target content file is private and identify an alternative target content file responsive to a determination that the target content file is private.

17. The system of claim 10, wherein the processor to determine whether an owner of the target content file has an authorized linking to the target content file based at least in part on a linking input.

18. A non-transitory computer readable storage medium storing instruction that when executed by a processor cause the processor to:
analyze data that describes user activity for an uploaded content file to obtain a statistical pattern, the uploaded content file relating to a target content file and the data comprising social data that comprises comments for the uploaded content file;
identify the target content file related to the uploaded content file based on the analysis of the data comprising the comments and on the statistical pattern, wherein the target content file comprises one or more of a movie, a show, or a television program and the uploaded content file comprises user-generated video content;

generate a link to the target content file in response to identifying the target content file related to the uploaded content file; and generate a new user interface document for the target content file, the new user interface document including a playable version of the uploaded content file and the link to the target content file.

* * * * *